United States Patent
Sekita

(10) Patent No.: US 7,460,311 B2
(45) Date of Patent: *Dec. 2, 2008

(54) ZOOM LENS SYSTEM AND IMAGE PICKUP APPARATUS INCLUDING THE SAME

(75) Inventor: Makoto Sekita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/839,212

(22) Filed: Aug. 15, 2007

(65) Prior Publication Data

US 2007/0291377 A1    Dec. 20, 2007

Related U.S. Application Data

(63) Continuation of application No. 11/129,821, filed on May 16, 2005, now Pat. No. 7,333,275.

(30) Foreign Application Priority Data

May 19, 2004    (JP) .............. 2004-148893

(51) Int. Cl.
G02B 15/14    (2006.01)

(52) U.S. Cl. .............. 359/682; 359/689; 359/738

(58) Field of Classification Search ......... 359/680–682, 359/689, 738
See application file for complete search history.

(56) References Cited

U.S. PATENT DOCUMENTS

| | | | |
|---|---|---|---|
| 4,647,160 A | 3/1987 | Ikemori | |
| 4,810,072 A | 3/1989 | Takahashi | |
| 4,838,666 A | 6/1989 | Shiraishi | |
| 5,270,863 A | 12/1993 | Uzawa | |
| 5,357,374 A | 10/1994 | Ohno | |
| 6,498,687 B1 | 12/2002 | Sekita | |
| 6,545,819 B1 | 4/2003 | Nanba et al. | |
| 6,735,020 B2 | 5/2004 | Sekita | |
| 6,744,564 B2 | 6/2004 | Mihara | |
| 6,809,879 B2 | 10/2004 | Mihara | |
| 7,333,275 B2 * | 2/2008 | Sekita ................. | 359/689 |
| 2002/0008920 A1 | 1/2002 | Mihara | |

(Continued)

FOREIGN PATENT DOCUMENTS

JP    59-018917    1/1984

(Continued)

*Primary Examiner*—Scott J Sugarman
(74) *Attorney, Agent, or Firm*—Canon USA Inc I.P. Div

(57) ABSTRACT

A compact zoom lens system having excellent optical performance. The zoom lens system includes a first lens unit of negative optical power, a second lens unit of positive optical power, a third lens unit of positive optical power, and an F-number defining member. The second lens unit is disposed on the image side of the first lens unit and includes a lens element disposed closest to the object side. The lens element has a rim, a surface on the object side and having a vertex, and an intersection point defined by an intersection between the surface and the rim. The third lens unit is disposed on the image side of the second lens unit. The F-number defining member is disposed along the optical axis between the vertex and the intersection point. Spaces between the first, second and third lens units vary during zooming.

22 Claims, 7 Drawing Sheets

U.S. PATENT DOCUMENTS

| | | |
|---|---|---|
| 2003/0058549 A1 | 3/2003 | Hagimori |
| 2003/0103157 A1 | 6/2003 | Watanabe |
| 2004/0080655 A1 | 4/2004 | Watanabe |
| 2005/0128601 A1 | 6/2005 | Hiroyuki |
| 2006/0114574 A1 | 6/2006 | Sekita |

FOREIGN PATENT DOCUMENTS

| | | |
|---|---|---|
| JP | 61-267721 | 11/1986 |
| JP | 63-135913 | 6/1988 |
| JP | 03-288113 | 12/1991 |
| JP | 05-323190 | 12/1993 |
| JP | 07-174971 | 7/1995 |
| JP | 07-261083 | 10/1995 |
| JP | 2001-272602 | 10/2001 |
| JP | 2002-48975 | 2/2002 |
| JP | 2002-55278 | 2/2002 |
| JP | 2002-365545 | 12/2002 |
| JP | 2003-5072 | 1/2003 |
| JP | 2003-149555 | 5/2003 |
| JP | 2003-149556 | 5/2003 |

* cited by examiner

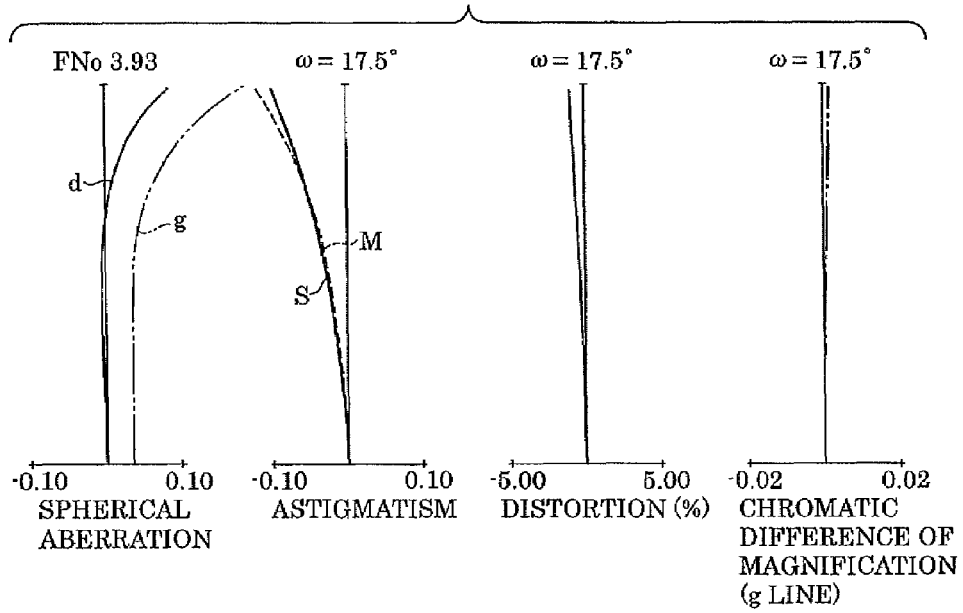
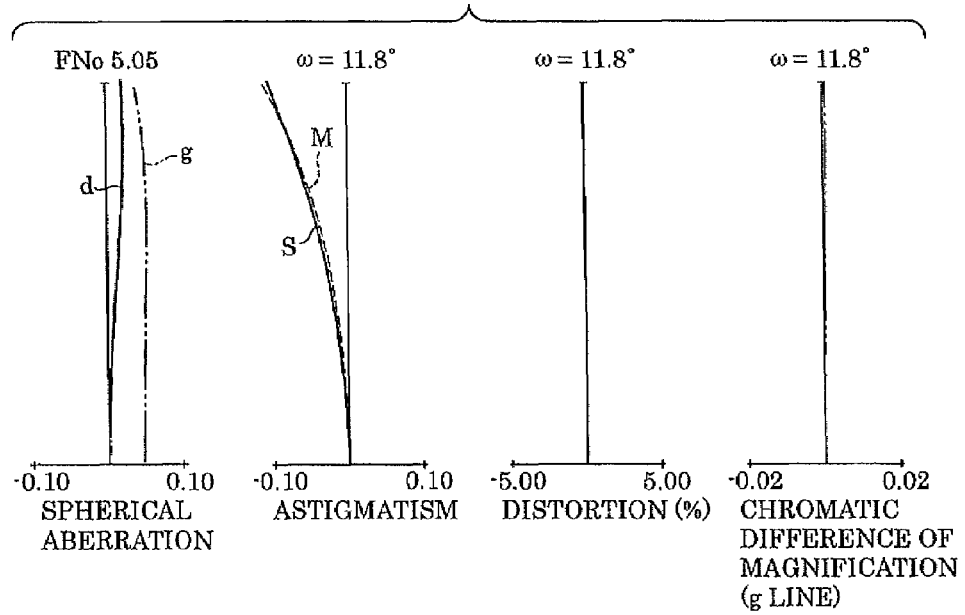

ZOOM LENS SYSTEM AND IMAGE PICKUP APPARATUS INCLUDING THE SAME

CROSS REFERENCE TO RELATED APPLICATIONS

This is a continuation of U.S. patent application Ser. No. 11/129,821 filed May 16, 2005, which claims priority from Japanese Patent Application No. 2004-148893 filed May 19, 2004, both of which are hereby incorporated by reference herein in their entirety.

BACKGROUND OF THE INVENTION

1. Field of the Invention

The present invention relates to a zoom lens system suitable for use in an image-capturing optical system, such as a digital still camera and a video camera.

2. Description of the Related Art

With recent developments of sophisticated image pickup apparatuses (cameras), such as video cameras and digital still cameras with solid-state image sensors, an optical system for use in such cameras requires a zoom lens system with a large aperture ratio including a wide angle of view.

In a camera of this type, various optical members, such as a color correction filter and a low-pass filter, are arranged between the end of the lens group and an image pickup device. Therefore, the optical system for use in such a camera requires a lens system with a relatively long back focal length.

For a camera with an image pickup device for color images, an optical system with good telecentricity on the image side is desired to avoid color shading.

Conventionally, there have been proposed a variety of two-unit zoom lens systems of a so-called short zoom type. Such a two-unit zoom lens system includes a first lens unit of negative refractive power and a second lens unit of positive refractive power to perform zooming by varying the distance therebetween. In such an optical system of a short zoom type, magnification is changed by moving the second lens unit of positive refractive power, while compensation for positional variations of an image point associated with the changes in magnification is implemented by the first lens unit of negative refractive power. Such a two-unit zoom lens system has a zoom ratio of about 2.

To further achieve a compact lens system with a zoom ratio of as high as 2 or above, a so-called three-unit zoom lens system has also been proposed (see, for example, Japanese Patent Publication No. 7-3507 corresponding to U.S. Pat. No. 4,810,072 and Japanese Patent Publication No. 6-40170 corresponding to U.S. Pat. No. 4,647,160). In the three-unit zoom lens system, a third lens unit of negative or positive refractive power is arranged on the image side of a two-unit zoom lens system.

There is a known three-unit zoom lens system having a long back focal length, good telecentricity, and a wide angle of view (see, for example, Japanese Patent Laid-Open No. 63-135913 corresponding to U.S. Pat. No. 4,838,666 and Japanese Patent Laid-Open No. 7-261083).

There is also a known three-unit zoom lens system in which zooming is performed by moving a second lens unit of positive refractive power and a third lens unit of positive refractive power, while a first lens unit of negative refractive power is fixed (see, for example, Japanese Patent Laid-Open No. 3-288113 corresponding to U.S. Pat. No. 5,270,863).

There is also a known three-unit zoom lens system with a relatively small number of constituent lenses, in which all lens units are moved for zooming, and a cemented lens is effectively included in a second lens unit to correct chromatic aberrations (see, for example, Japanese Patent Laid-Open No. 2001-272602 corresponding to U.S. Pat. No. 6,498,687, Japanese Patent Laid-Open No. 2002-48975 corresponding to U.S. Patent Application Publication No. 2002008920, Japanese Patent Laid-Open No. 2003-5072, Japanese Patent Laid-Open No. 2003-149555, and Japanese Patent Laid-Open No. 2003-149556).

There is also a known three-unit zoom lens system in which a lens of negative refractive power in a first lens unit has aspheric surfaces on the object side and the image side to further reduce the number of constituent lenses (see, for example, Japanese Patent Laid-Open No. 5-323190 corresponding to U.S. Pat. No. 5,357,374, Japanese Patent Laid-Open No. 7-174971, Japanese Patent Laid-Open No. 2002-55278 corresponding to U.S. Patent Application Publication No. 2003058549, and Japanese Patent Laid-Open No. 2002-365545 corresponding to U.S. Patent Application Publication No. 2003103157).

A three-unit zoom lens system designed for 35-mm film photos is not readily applicable to an image pickup apparatus with a solid-state image sensor, because its back focal length is too long and its telecentricity is insufficient for use in an image pickup apparatus with a solid-state image sensor.

To achieve a compact camera with a zoom lens system having a high zoom ratio, a so-called barrel-retractable zoom lens system has been widely used these days. In the barrel-retractable zoom lens system, the distance between adjacent lens units is reduced during non-use to decrease the amount of projection of lenses from the camera body.

Generally, the length of each lens unit along the optical axis increases as the number of lenses in each lens unit increases. Moreover, the total lens length increases as the amount of movement of each lens unit for zooming and focusing increases. If the number of lenses in each lens unit is large, or if the amount of movement of each lens unit is large, the optical system causes an increase in the lens length when retracted, and thus cannot be used in a barrel-retractable zoom lens system.

SUMMARY OF THE INVENTION

The present invention is directed to a compact zoom lens system having excellent optical performance and an image pickup apparatus incorporating the same.

In one aspect of the present invention, a zoom lens system includes a first lens unit of negative optical power (the reciprocal of the focal length), a second lens unit of positive optical power, a third lens unit of positive optical power, and an F-number defining member. The second lens unit is disposed on the image side of the first lens unit and includes a lens element disposed closest to the object side. The lens element includes a rim, a surface on the object side and having a vertex, and an intersection point defined by an intersection between the surface and the rim. The third lens unit is disposed on the image side of the second lens unit. The F-number defining member is disposed along the optical axis between the vertex and the intersection point.

Further features and advantages of the present invention will become apparent from the following description of exemplary embodiments with reference to the attached drawings.

BRIEF DESCRIPTION OF THE DRAWINGS

FIG. 3 shows aberration curves at the middle zoom position of the zoom lens system according to the first embodiment.

FIG. 4 shows aberration curves at the telephoto end of the zoom lens system according to the first embodiment.

DESCRIPTION OF THE EMBODIMENTS

Embodiments of a zoom lens system of the present invention and an image pickup apparatus including the zoom lens system will now be described.

Figure 1:
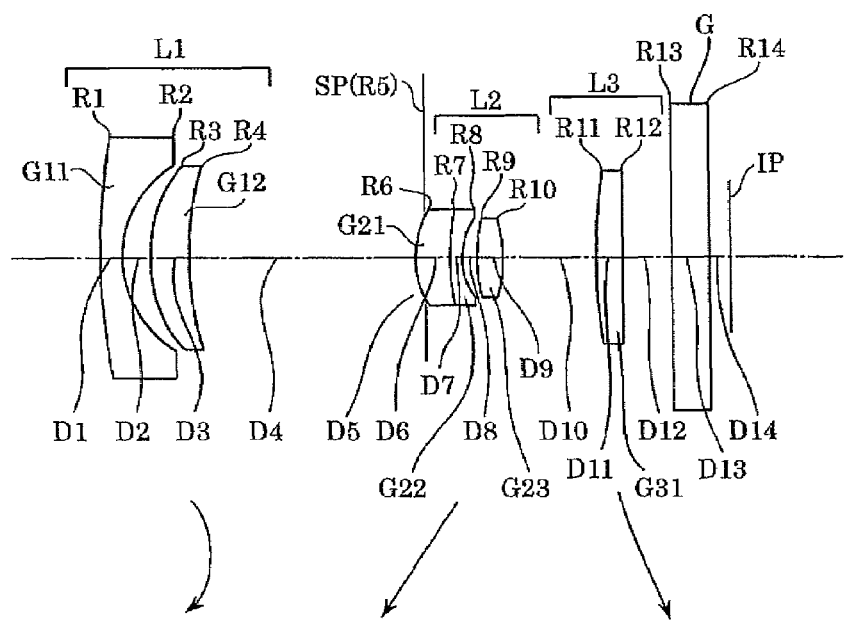
FIG. 1 shows an optical cross-section of a zoom lens system according to a first embodiment.
Figure 2:
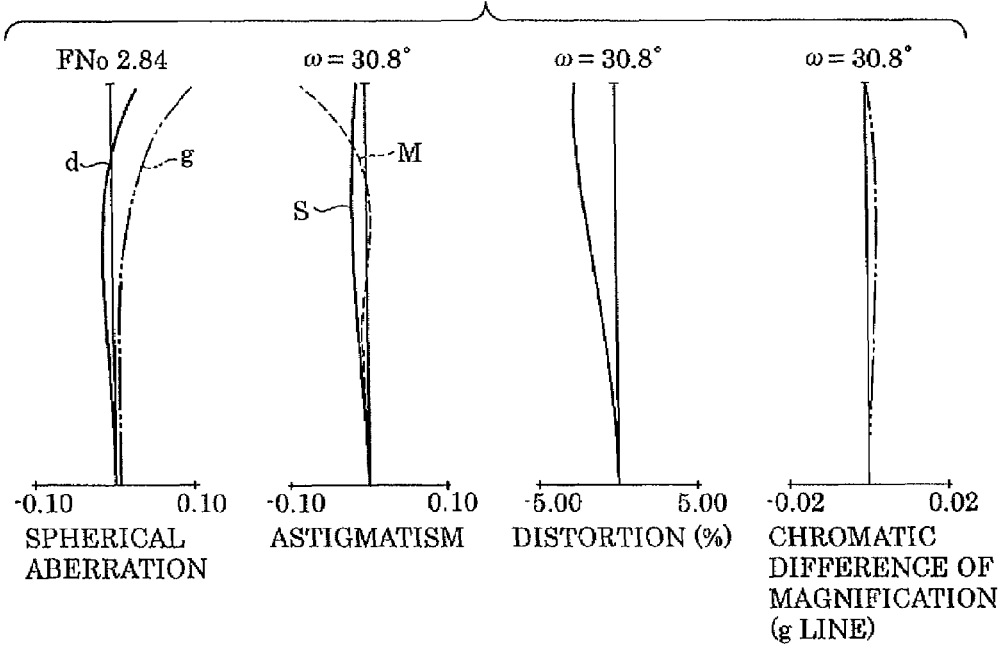
FIG. 2 shows aberration curves at the wide-angle end of the zoom lens system according to the first embodiment.

FIG. 1 is a cross-sectional view at the wide-angle end (short focal length end) of a zoom lens system according to the first embodiment of the present invention. FIG. 2, FIG. 3, and FIG. 4 show aberration curves at the wide-angle end, at the middle zoom position, and at the telephoto end (long focal length end), respectively, in the zoom lens system of the first embodiment. The zoom lens system of the first embodiment has a zoom ratio of about 2.9 and an aperture ratio ranging from about 2.6 to 4.8.

Figure 5:
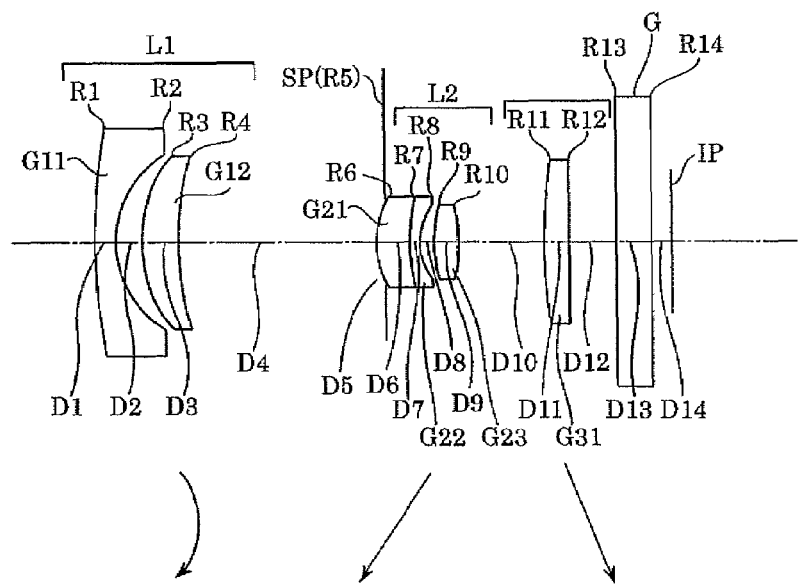
FIG. 5 shows an optical cross-section of a zoom lens system according to a second embodiment.
Figure 6:
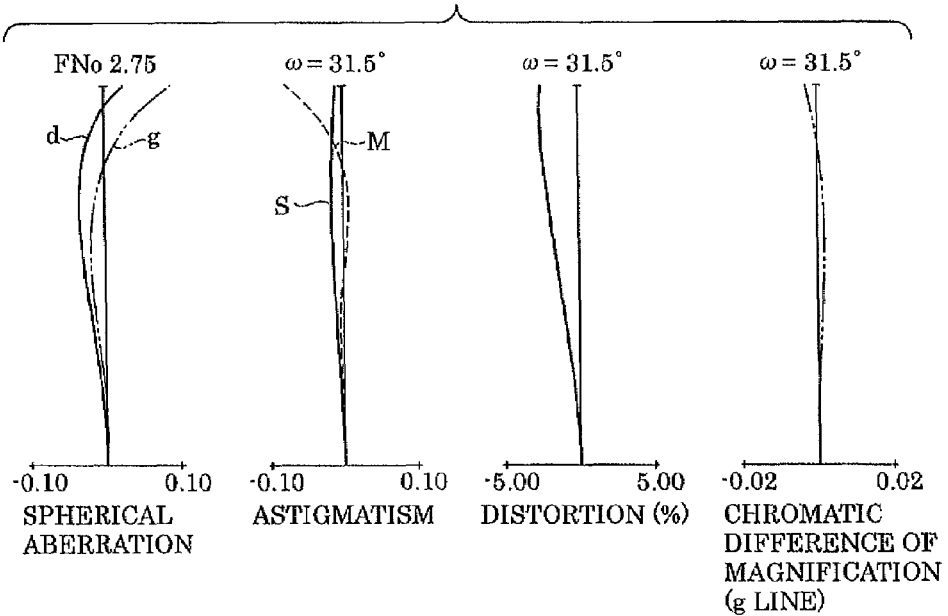
FIG. 6 shows aberration curves at the wide-angle end of the zoom lens system according to the second embodiment.
Figure 7:
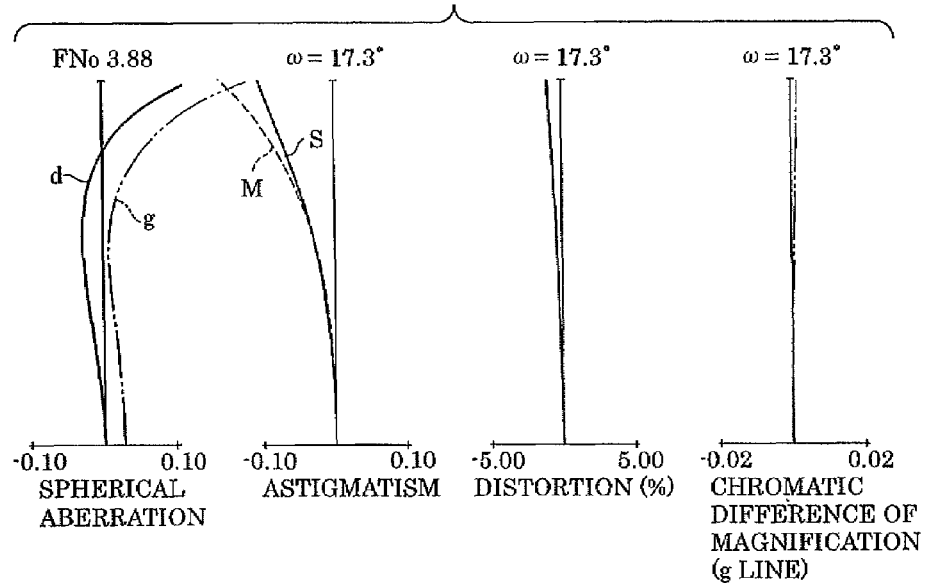
FIG. 7 shows aberration curves at the middle zoom position of the zoom lens system according to the second embodiment.
Figure 8:
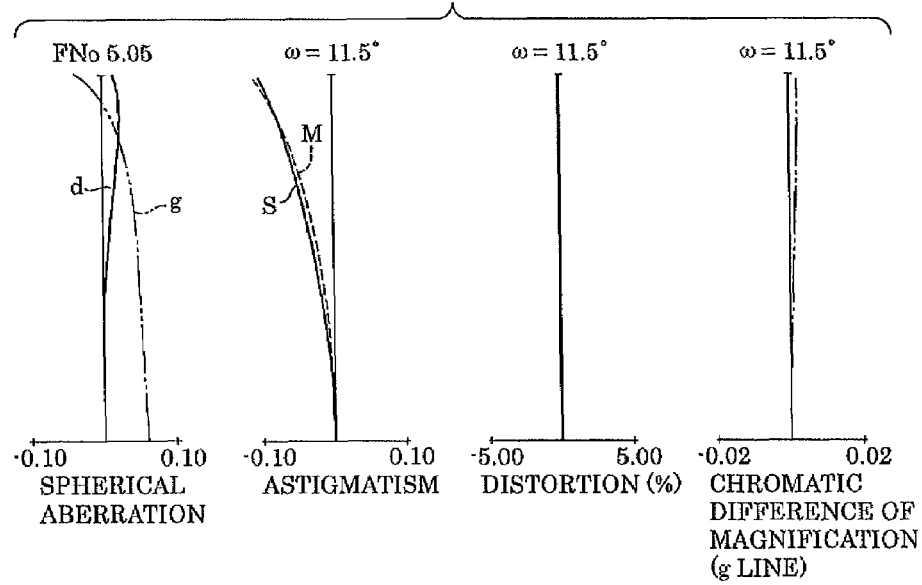
FIG. 8 shows aberration curves at the telephoto end of the zoom lens system according to the second embodiment.

FIG. 5 is a cross-sectional view at the wide-angle end of a zoom lens system according to the second embodiment of the present invention. FIG. 6, FIG. 7, and FIG. 8 show aberration curves at the wide-angle end, at the middle zoom position, and at the telephoto end, respectively, in the zoom lens system of the second embodiment. The zoom lens system of the second embodiment has a zoom ratio of about 3.0 and an aperture ratio ranging from about 2.8 to 5.1.

Figure 9:
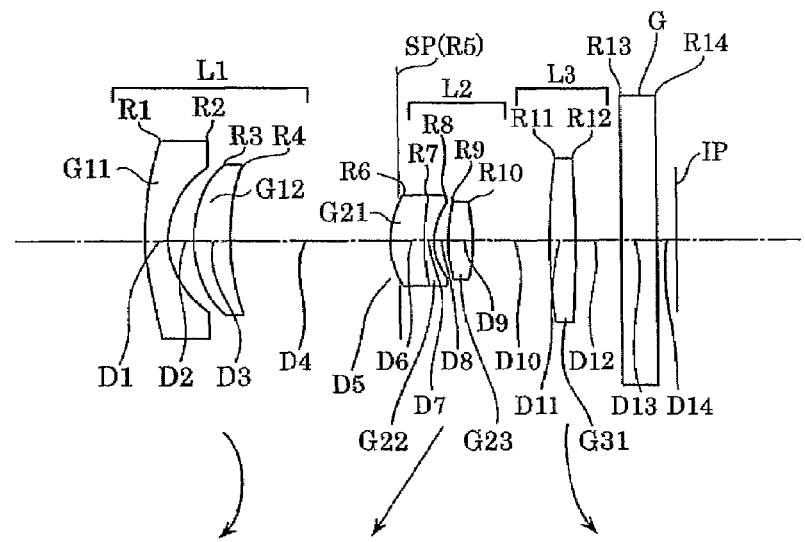
FIG. 9 shows an optical cross-section of a zoom lens system according to a third embodiment.
Figure 10:
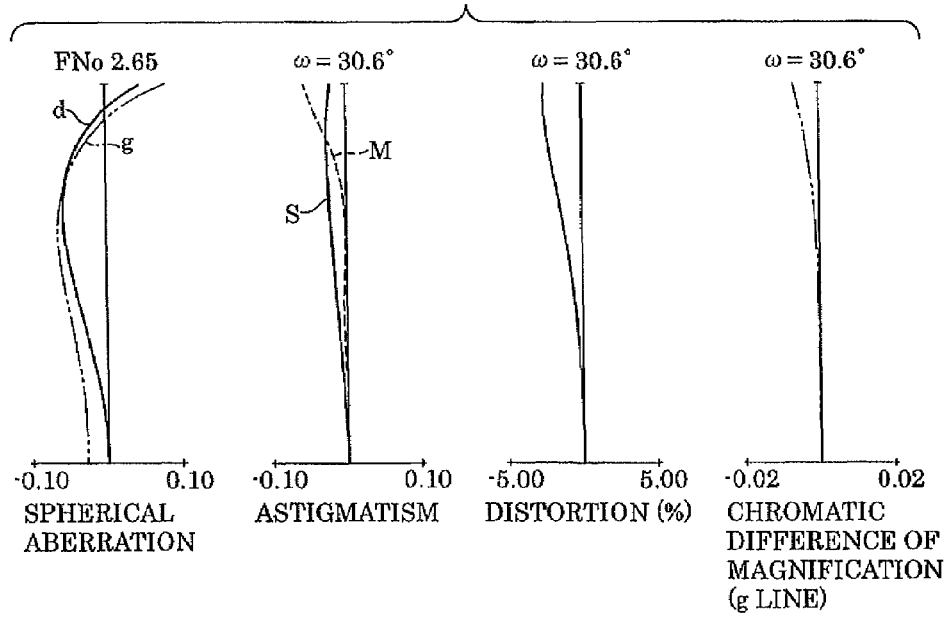
FIG. 10 shows aberration curves at the wide-angle end of the zoom lens system according to the third embodiment.
Figure 11:
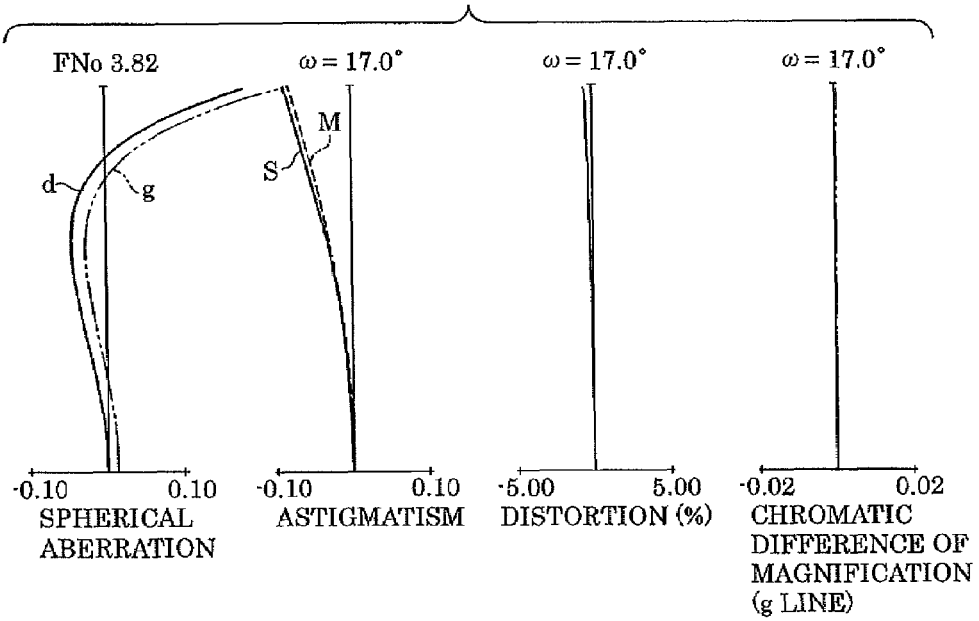
FIG. 11 shows aberration curves at the middle zoom position of the zoom lens system according to the third embodiment.
Figure 12:
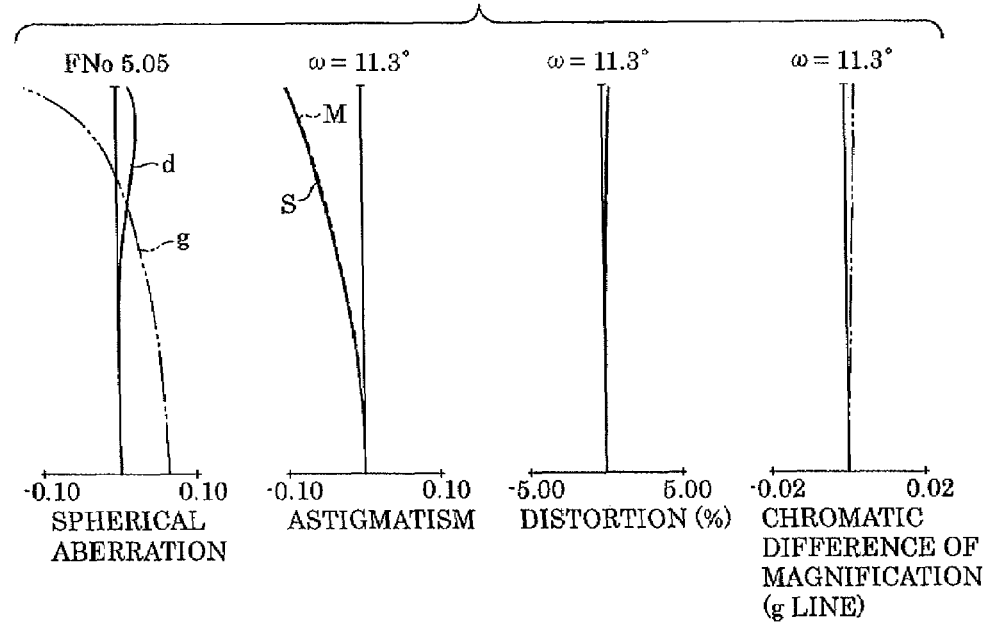
FIG. 12 shows aberration curves at the telephoto end of the zoom lens system according to the third embodiment.

FIG. 9 is a cross-sectional view at the wide-angle end of a zoom lens system according to the third embodiment of the present invention. FIG. 10, FIG. 11, and FIG. 12 show aberration curves at the wide-angle end, at the middle zoom position, and at the telephoto end, respectively, in the zoom lens system of the third embodiment. The zoom lens system of the third embodiment has a zoom ratio of about 3.0 and an aperture ratio ranging from about 2.7 to 5.1.

Figure 13:
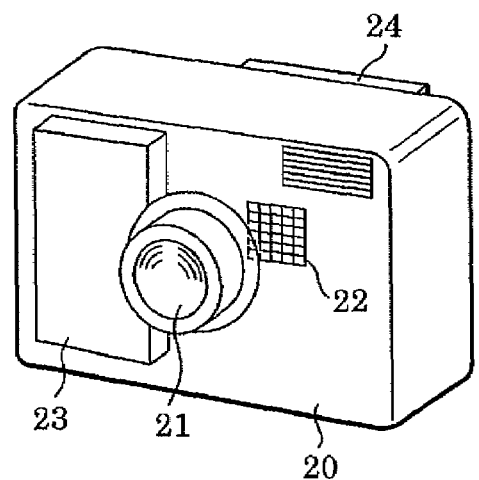
FIG. 13 shows an image pickup apparatus of the present invention.

FIG. 13 shows a digital still camera with a zoom lens system of the present invention.

The zoom lens system in each embodiment is an image-capturing lens system for use in an image pickup apparatus. In each of the cross-sectional views in FIGS. 1, 5, and 9, an object (front) side is on the left and an image (rear) side is on the right.

Each of the cross-sectional views in FIGS. 1, 5, and 9 shows a first lens unit L1 of negative refractive power (optical power=reciprocal of focal length), a second lens unit L2 of positive refractive power, a third lens unit L3 of positive refractive power, and an F-number defining member SP (hereinafter also referred to as "aperture stop") serving as an aperture stop defining (limiting) an open F-number beam.

An optical block G is equivalent to an optical filter, a faceplate, a crystal low-pass filter, an infrared cut filter, or the like. If the zoom lens system is used as an image-capturing system for a video camera or a digital still camera, an image plane IP is an imaging surface for a solid-state image sensor (photoelectric converter), such as a charge-coupled device (CCD) sensor and a complementary metal oxide semiconductor (CMOS) sensor. If the zoom lens system is used as an image-capturing system for a silver salt film camera, the image plane IP is a photosensitive surface equivalent to a film surface.

In aberration curves, d and g denote a d line and a g line, respectively; and M and S denote a meridional image plane and a sagittal image plane, respectively. A chromatic aberration of magnification is indicated by the g line.

In each embodiment, a wide-angle end and a telephoto end are zoom positions when a lens unit for varying the magnification is located at both ends of the mechanically movable range along the optical axis.

In the zoom lens system of each embodiment, in zooming from the wide-angle end to the telephoto end, the first lens unit L1 reciprocates in a curve convex towards the image side, the second lens unit L2 moves to the object side, and the third lens unit L3 moves to the image side.

In the zoom lens system of each embodiment, magnification is varied mainly by movement of the second lens unit L2, while compensation for the shift of an image point associated with variations in magnification is implemented by reciprocation of the first lens unit L1 and movement of the third lens unit L3 toward the image side.

The third lens unit L3 accommodates an increase in refractive power of the image-capturing system associated with the size reduction of an image pickup device. With the third lens unit L3 provided, the zoom lens system of each embodiment reduces the refractive power of a short zoom system composed of the first lens unit L1 and the second lens unit L2, and particularly prevents the occurrence of aberrations in lenses constituting the first lens unit L1, thereby achieving excellent optical performance.

Moreover, the formation of a telecentric image on the image side, which is required for an image pickup apparatus with a solid-state image sensor or the like, is achieved by having the third lens unit L3 serve as a field lens.

The position of the F-number defining member SP of the present invention will now be described with reference to FIG. 14. In the second lens unit L2, as illustrated, the F-number defining member SP is located, along the optical axis, between a vertex G21a and an intersection point G21b. The vertex G21a is located on the object side of a lens G21 that is closest, in the second lens unit L2, to the object. The intersection point G21b is the intersection between a surface S6 on the object side of the lens G21 and a rim (edge) P6.

Since the F-number defining member SP is located in the second lens unit L2 and moved together therewith in zooming, the distance between an entrance pupil (related to the arrangement of the F-number defining member SP) and the first lens unit L1 at the wide-angle side is reduced. This prevents an increase in the outer diameter (effective diameter) of the lenses constituting the first lens unit L1. Furthermore, the first lens unit L1 and the third lens unit L3, with the F-number defining member SP interposed therebetween, cancel various off-axis aberrations, thereby achieving excellent optical performance without increasing the number of constituent lenses.

In each embodiment, the first lens unit L1 includes a meniscus lens G11 of negative refractive power and a meniscus lens G12 of positive refractive power, in which each lens has a convex surface on the object side. The second lens unit L2 includes, in order from the object side to the image side, a cemented lens and a lens G23. The cemented lens is formed by bonding the meniscus lens G21 of positive refractive power to a meniscus lens G22 of negative refractive power. The lens G21 has a convex surface on the object side, and the lens G22 has a concave surface on the image side. The lens G23 of positive refractive power has a convex surface on both the object and image sides. The third lens unit L3 includes a lens G31 of positive refractive power.

The first lens unit L1 may include two or more lenses, the second lens unit L2 may include three or more lenses, and the third lens unit L3 may include one or more lenses.

In each embodiment, the F-number defining member SP is arranged as described above to reduce the lens length when retracted.

In a known three-unit zoom lens system of a short zoom type, a lens stop (stop member) for defining an open F-number is disposed between a first lens unit and a second lens unit. The lens stop is disposed on the object side of a vertex of a lens that is closest, in the second lens unit, to the object.

Generally, in the first lens unit of a short zoom type, a positive meniscus lens having a concave surface on the image side is disposed on the side closest to the image side. Therefore, in making the distance between the first lens unit and the second lens unit shorter, for lens retraction, than that during image-capturing operation, the rim of a lens that is closest, in the first lens unit, to the image side interferes with the lens stop. Thus, no further lens retraction can be made, due to a gap created between a vertex on the object side of the lens and the rim of the lens.

Moreover, when the lens stop is disposed between the first lens unit and the second lens unit, a certain distance must be maintained between the lens stop and a vertex on the object side of a lens that is closest, in the second lens unit, to the object. This is another obstacle to the reduction of the lens length when retracted.

Figure 14:
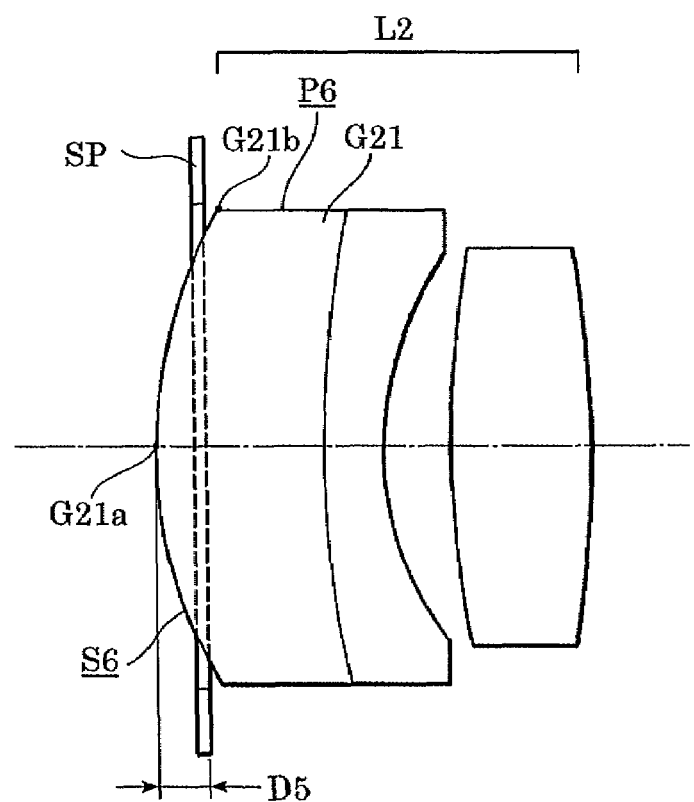
FIG. 14 shows an F-number determining member of the present invention.

Thus, in each embodiment, as shown in FIG. 14, the F-number defining member SP serving as a lens stop defining an open F-number is disposed between the vertex G21a and the intersection point G21b. This arrangement minimizes the distance between the first lens unit L1 and the second lens unit L2, since no component causing interference in lens retraction is disposed therebetween.

In each embodiment, as described above, the lens structure and the arrangement of the F-number defining member (aperture stop) SP are designed such that both a desired refractive power arrangement and the correction of aberrations are implemented. A compact lens system with short lens length when retracted can thus be achieved while excellent optical performance is maintained.

The lens structure of each lens unit will now be described in detail.

The first lens unit L1 allows principal rays to converge, for aperture imaging, at the center of the F-number defining member SP. Various off-axis aberrations, such as astigmatism and distortion, tend to occur particularly in a zoom area at the wide-angle side, due to a large amount of refractive power of principal rays.

Thus, in each embodiment, similarly to a general wide-angle lens, the first lens unit L1 includes the lens G11 of negative refractive power and the lens G12 of positive refractive power so that an increase in the diameter (effective diameter) of a lens closest to the object can be prevented.

Moreover, the meniscus lens G11 has an aspheric surface on the object side that can increase positive refractive power around the perimeter of the lens and an aspheric surface on the image side that can decrease negative refractive power around the perimeter of the lens. This not only allows for the correction of astigmatism and distortion in a balanced manner, but also contributes to the reduced total lens size, as the number of lenses constituting the first lens unit L1 is as small as two.

Furthermore, to limit the occurrence of off-axis aberrations caused by the refraction of principal rays, the lenses G11 and G12 constituting the first lens unit L1 are substantially spherical and concentric with center at the point where the optical axis intersects with the aperture stop SP.

Next, in the second lens unit L2, the meniscus lens G21 of positive refractive power has a convex surface on the object side. This shape decreases the angle of refraction of principal rays from the first lens unit L1, and limits the occurrence of various off-axis aberrations.

Moreover, the lens G21 provides the highest path through which on-axis rays pass, and is mainly related to the correction of spherical aberrations and coma.

Thus, in each embodiment, the lens G21 has an aspheric surface on the object side that can decrease positive refractive power around the perimeter of the lens, so that the spherical aberrations and coma can be properly corrected.

The lens G22 bonded to the lens G21 has a concave surface on the image side such that aberrations on the object side of the lens G21 can be canceled.

The third lens unit L3 is composed of the lens G31 with a convex surface on both the object side and the image side. The third lens unit L3 serves also as a field lens to achieve telecentricity on the image side.

If the back focal length is sk', the focal length of the third lens unit L3 is f3, and the imaging magnification of the third lens unit L3 is β3, their relationship can be expressed as $$sk'=f3(1-\beta 3)$$

provided that $$0<\beta 3<1.0.$$

Here, when the third lens unit L3 is moved to the image side in zooming from the wide-angle end to the telephoto end, the back focal length sk' is reduced and the imaging magnification β3 of the third lens unit L3 increases in the zoom area on the telephoto side.

As a result, the third lens unit L3 varies the magnification in cooperation with the second lens unit L2. This reduces the amount of movement of the second lens unit L2, saves space required for such movement, and thus contributes to the reduced size of the lens system.

When capturing images of a nearby object with the zoom lens system according to each embodiment, excellent performance can be obtained by moving the first lens unit L1 to the object side, or by moving the third lens unit L3 to the object side.

This not only prevents an increase in the diameter of a front lens caused by focusing of the first lens unit L1 closest to the object side, but also prevents an increase in the load on an actuator caused by moving the first lens unit L1, which is heaviest in terms of lens weight. Moreover, in zooming, the first lens unit L1 can be moved in synchronization with the second lens unit L2 in a simple manner using a cam or the like. A simple mechanical structure and a higher degree of accuracy can thus be achieved.

Focusing may be performed only by the third lens unit L3.

For focusing using the third lens unit L3, if the third lens unit L3 is moved to the image side in zooming from the wide-angle end to the telephoto end, the third lens unit L3 can be placed on the image plane side at the wide-angle end, where the amount of movement of lens units for focusing is large. This minimizes the total amount of movement required for the third lens unit L3 in zooming and focusing, and contributes to the reduced size of the entire lens system.

In the zoom lens system according to each embodiment, at least one of the following conditions is satisfied to achieve excellent optical performance or to reduce the size of the entire lens system. Effects corresponding to each condition are obtained.

The following condition is satisfied to reduce the lens length when retracted:

$$0.2 < D2S/D2R < 0.9 \quad (1)$$

where D2S is the distance (positive value) along the optical axis between the vertex G21$a$ on the object side of the lens G21 and the F-number defining member SP; and D2R is the distance along the optical axis between the vertex G21$a$ and the intersection point G21$b$.

If the lower limit of the condition (1) is exceeded, the lens surface on the image side of the positive lens G12 interferes with the lens surface on the object side of the positive lens G21, so that it is difficult to sufficiently reduce the lens length when retracted.

It is undesirable that the upper limit of the condition (1) be exceeded, because the increased distance between the F-number defining member SP and the first lens unit L1 leads to an increase in the lens diameter of the first lens unit L1.

A range for the condition (1) is as follows:

$$0.3 < D2S/D2R < 0.8 \quad (1a)$$

The following condition is satisfied to reduce the total lens length and the lens length when retracted:

$$0.02 < (D2S+L1T)/ft < 0.08 \quad (2)$$

where D2S is the distance along the optical axis between the vertex G21$a$ on the object side of the lens G21 and the F-number defining member SP; L1T is the distance, at the telephoto end, between the vertex on the image side of the lens G12 and the vertex G21$a$ on the object side of the lens G21; and ft is the focal length of the entire lens system at the telephoto end.

Similar to the condition (1), if the lower limit of the condition (2) is exceeded, the lens surface on the image side of the positive lens G12 interferes with the lens surface on the object side of the lens G21, so that it is difficult to sufficiently reduce the length of the lens system when retracted.

It is undesirable that the upper limit of the condition (2) be exceeded, because the increased distance between the F-number defining member SP and the first lens unit L1 leads to an increase in the lens diameter of the first lens unit L1.

A range for the condition (2) is as follows:

$$0.03 < (D2S+L1T)/ft < 0.07 \quad (2a)$$

The following condition is satisfied to reduce the total length of the zoom lens system (optical system):

$$-2.6 < f1/fw < -1.6 \quad (3)$$

where ft is the focal length of the first lens unit L1, and fw is the focal length of the entire optical system at the wide-angle end.

If the upper limit of the condition (3) is exceeded, the total length of the optical system is reduced. However, the correction of astigmatism, especially the correction of distortion for the entire zoom area becomes difficult, due to the reduced focal length of the first lens unit L1.

It is undesirable that the lower limit of the condition (3) be exceeded, because the amount of movement of the first lens unit L1 in zooming increases, which causes an increase in the total length of the optical system.

A range for the condition (3) is as follows:

$$-2.4 < f1/fw < -1.8 \quad (3a)$$

The following condition is satisfied to reduce the total lens length of the optical system:

$$1.2 < f2/fw < 2.0 \quad (4)$$

where ft is the focal length of the second lens unit L2, and fw is the focal length of the entire optical system at the wide-angle end.

It is undesirable that the upper limit of the condition (4) be exceeded, because the amount of movement of the second lens unit L2 in zooming increases, which causes an increase in the total length of the optical system.

If the lower limit of the condition (4) is exceeded, the total length of the optical system is reduced. However, the correction of astigmatism for the entire zoom area becomes difficult, due to the reduced focal length of the second lens unit L2.

A range for the condition (4) is as follows:

$$1.3 < f2/fw < 1.8 \quad (4a)$$

The following condition is satisfied to reduce the total length of the optical system and the total lens length when retracted:

$$1.3 < (DL1+DL2+DL3)/fw < 2.0 \quad (5)$$

where DL1 is the distance between the vertex on the object side of the lens G11 and the vertex on the image side of the lens G12; DL2 is the distance between the vertex on the object side of the lens G21 and the vertex on the image side of the lens G23; and DL3 is the distance between the vertex on the object side of the lens G31 and the vertex on the image side of the lens G31; and fw is the focal length of the entire optical system at the wide-angle end.

It is undesirable that the upper limit of the condition (5) be exceeded, because the total lens length when retracted cannot be easily reduced due to the increased thickness of each lens.

If the lower limit of the condition (5) is exceeded, the reduced thickness of each lens allows for a reduced total lens length when retracted. However, the curvature of each lens must be reduced to reduce the thickness of each lens, so that the focal length of each lens unit increases. The increase in the focal length of each lens unit causes an increase in the amount of movement of each lens unit in zooming. This leads to an increase in the length of a cam tube that allows for the movement of each lens unit. As a result, even if the thickness of each lens is reduced, the total lens length increases.

A range for the condition (5) is as follows:

$$1.5 < (DL1+DL2+DL3)/fw < 1.9 \quad (5a)$$

The following condition is satisfied:

$$-1.6 < f11/f21 < -0.8 \quad (6)$$

where f11 is the focal length of the lens G11, and f21 is the focal length of the lens G21.

In the condition (6), the absolute values of the focal length f11 and the focal length f21 are substantially equal, and the same material is used for the lens G11 and the lens G21 to minimize the Petzval sum.

A range for the condition (6) is as follows:

$$-1.5 < f11/f21 < -0.9 \quad (6a)$$

Here, the following conditions is satisfied:

$$1.65 < n1n$$

$$1.65 < n2p$$

where n1n and n2p are the refractive indexes of the materials of the lens G11 and the lens G21, respectively, and the following conditions is satisfied:

$$1.75 < n1n$$

$$1.75 < n2p$$

By setting each component as described above, each embodiment achieves a zoom lens system particularly suitable for an image-capturing system with a solid-state image sensor, having a compact size with a small number of constituent lenses, particularly suitable for a barrel-retractable zoom lens system, and having excellent optical performance with a zoom ratio of 2 to 3.

Moreover, each embodiment incorporates aspheric surfaces into lens units to properly define the refractive power, in particular, of the first lens unit L1 and the second lens unit L2, thereby effectively correcting various off-axis aberrations, specifically, astigmatism, distortion, and spherical aberrations, when the aperture ratio increases.

Each embodiment described above is applicable to a type of zoom lens system in which two lens units (such as the first and second lens units, the first and third lens units, and the second and third lens units), instead of three lens units, are moved, in zooming, to vary the distance between adjacent lens units.

Moreover, a lens unit with small refractive power may be added to the object side of the first lens unit L1, or/and to the image side of the third lens unit L3.

Although the F-number defining member SP may be provided separately from a lens-holding member (lens holder) holding the lenses constituting the second lens unit L2, the lens-holding member may be given the function of the F-number defining member SP.

Next, numerical examples of the present invention will now be described. In each example, i denotes the order of arrangement of lens surfaces from the object side, Ri denotes the radius of curvature of the i-th lens surface (i-th surface), Di denotes the lens thickness or air gap between the i-th surface and the (i+1)-th surface, Ni and νi denote the refractive index and Abbe number, respectively, with respect to the d line.

Two lens surfaces that are closest to the image side are glass members, such as faceplates. An aspheric shape can be expressed as follows:

$$x = (h^2/R)/[1 + \{1-(1+k)(h/R)^2\}^{1/2}] + Bh^4 + Ch^6 + Dh^8$$

where x is the displacement, along the optical axis, relative to the surface vertex at the height h from the optical axis; k is a conical constant; B, C, and D are aspheric coefficients; and R is paraxial radius of curvature.

In addition, "e-0X" means "$\times 10^{-X}$", denotes a focal length, FNo denotes an F number, and ω denotes a half angle of view. The relationship between the respective conditional expressions described above and the numerical examples is shown in Table 1.

In numerical examples 1 to 3, the values of D5 are negative because lens surfaces are counted in the order of the F-number defining member SP and the lens G21 of the second lens unit L2, from the object side. In the structure, as shown in FIG. 14, the F-number defining member (aperture stop) SP is located on the image side of the vertex G21a by the absolute value of D5.

| Numerical Example 1 | | | |
|---|---|---|---|
| f = 5.95~17.06 FNo = 2.84~5.05 2ω = 61.6°~23.5° | | | |
| R1 = 27.620 | D1 = 1.20 | N1 = 1.882997 | ν1 = 40.8 |
| R2 = 4.710 | D2 = 1.30 | | |
| R3 = 6.882 | D3 = 1.95 | N2 = 1.846660 | ν2 = 23.9 |
| R4 = 15.357 | D4 = variable | | |
| R5 = stop | D5 = −0.50 | | |
| R6 = 4.031 | D6 = 1.70 | N3 = 1.882997 | ν3 = 40.8 |
| R7 = 14.306 | D7 = 0.60 | N4 = 1.808095 | ν4 = 22.8 |
| R8 = 3.293 | D8 = 0.63 | | |
| R9 = 12.095 | D9 = 1.30 | N5 = 1.696797 | ν5 = 55.5 |
| R10 = −16.863 | D10 = variable | | |
| R11 = 20.170 | D11 = 1.30 | N6 = 1.696797 | ν6 = 55.5 |
| R12 = −73.163 | D12 = variable | | |
| R13 = ∞ | D13 = 1.90 | N7 = 1.516330 | ν7 = 64.1 |
| R14 = ∞ | | | |

| | f | | |
|---|---|---|---|
| D | 5.95 | 14.51 | 17.06 |
| D4 | 11.70 | 2.04 | 0.91 |
| D10 | 4.57 | 13.54 | 15.74 |
| D12 | 2.50 | 1.19 | 1.15 |

| Aspheric Coefficients | | | |
|---|---|---|---|
| R1 | k = 0.00000e+00 | B = 1.61680e−04 | C = −2.27651e−06 | D = 2.40573e−08 |
| R2 | k = −1.59793e+00 | B = 1.58635e−03 | C = 9.56045e−07 | D = 2.10463e−07 |
| R6 | k = −2.87748e−01 | B = −7.69444e−05 | C = −1.29351e−06 | |

| Numerical Example 2 | | | |
|---|---|---|---|
| f = 5.80~17.41 FNo = 2.75~5.05 2ω = 62.9°~23.1° | | | |
| R1 = 25.230 | D1 = 1.30 | N1 = 1.860000 | ν1 = 41.0 |
| R2 = 4.416 | D2 = 1.20 | | |
| R3 = 6.152 | D3 = 2.00 | N2 = 1.846660 | ν2 = 23.9 |
| R4 = 11.714 | D4 = variable | | |
| R5 = stop | D5 = −0.45 | | |
| R6 = 4.045 | D6 = 1.70 | N3 = 1.860000 | ν3 = 41.0 |
| R7 = 195.838 | D7 = 0.60 | N4 = 1.805181 | ν4 = 25.4 |
| R8 = 3.379 | D8 = 0.64 | | |
| R9 = 12.030 | D9 = 1.30 | N5 = 1.696797 | ν5 = 55.5 |
| R10 = −14.496 | D10 = variable | | |
| R11 = 18.026 | D11 = 1.25 | N6 = 1.603112 | ν6 = 60.6 |
| R12 = −108.204 | D12 = variable | | |
| R13 = ∞ | D13 = 1.90 | N7 = 1.516330 | ν7 = 64.1 |
| R14 = ∞ | | | |

| | f | | |
|---|---|---|---|
| D | 5.80 | 14.74 | 17.41 |
| D4 | 10.79 | 1.80 | 0.84 |
| D10 | 4.12 | 13.54 | 15.94 |
| D12 | 2.63 | 1.35 | 1.25 |

| Aspheric Coefficients | | | |
|---|---|---|---|
| R1 | k = 0.00000e+00 | B = 2.80275e−04 | C = −2.88598e−06 | D = 1.46272e−08 |

-continued

Numerical Example 2

| | | | |
|---|---|---|---|
| R2 k = −1.39250e+00 | B = 1.85779e−03 | C = 1.54737e−05 | D = 4.32845e−07 |
| R6 k = −3.31345e−01 | B = −3.39723e−05 | C = −6.42158e−06 | |

Numerical Example 3 f = 6.00~17.82 FNo = 2.65~5.05 2ω = 61.2°~22.5°

| | | | |
|---|---|---|---|
| R1 = 12.441 | D1 = 1.20 | N1 = 1.882997 | ν1 = 40.8 |
| R2 = 3.777 | D2 = 1.30 | | |
| R3 = 5.769 | D3 = 1.80 | N2 = 1.846660 | ν2 = 23.9 |
| R4 = 9.500 | D4 = variable | | |
| R5 = stop | D5 = −0.45 | | |
| R6 = 3.917 | D6 = 1.80 | N3 = 1.882997 | ν3 = 40.8 |
| R7 = 102.584 | D7 = 0.60 | N4 = 1.805181 | ν4 = 25.4 |
| R8 = 3.188 | D8 = 0.60 | | |
| R9 = 11.097 | D9 = 1.20 | N5 = 1.696797 | ν5 = 55.5 |
| R10 = −15.021 | D10 = variable | | |
| R11 = 19.734 | D11 = 1.30 | N6 = 1.696797 | ν6 = 55.5 |
| R12 = −56.534 | D12 = variable | | |
| R13 = ∞ | D13 = 1.90 | N7 = 1.516330 | ν7 = 64.1 |
| R14 = ∞ | | | |

| | f | | |
|---|---|---|---|
| D | 6.00 | 15.07 | 17.82 |
| D4 | 8.72 | 1.54 | 0.72 |
| D10 | 3.91 | 13.71 | 16.19 |
| D12 | 2.38 | 0.94 | 0.82 |

Aspheric Coefficients

| | | | |
|---|---|---|---|
| R1 k = 0.00000e+00 | B = −4.72130e−04 | C = 1.36909e−05 | D = −1.60809e−07 |
| R2 k = −1.30721e+00 | B = 1.37255e−03 | C = 1.84274e−05 | D = 1.09018e−06 |
| R6 k = −3.29927e−01 | B = −3.17633e−05 | C = −1.88218e−05 | |

Next, an example of a digital still camera (image pickup apparatus), in which the zoom lens system of the present invention serves as an image-capturing optical system, will now be described with reference to FIG. 13.

Referring to FIG. 13, the digital still camera includes a camera body 20; an image-capturing optical system 21 composed of the zoom lens system of the present invention; a solid-state image sensor (photoelectric converter) 22, such as a CCD sensor and a CMOS sensor, which receives light from a subject image formed by the image-capturing system 21; a memory 23 for recording information corresponding to a subject image photoelectrically converted by the solid-state image sensor 22; and a finder 24 for observing a subject image produced by a liquid-crystal display panel, or the like, and formed on the solid-state image sensor 22.

An image pickup apparatus that is compact and provides high optical performance can thus be achieved by applying the zoom lens system of the present invention to an image pickup apparatus, such as a digital still camera.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens system having an optical axis and object and image sides, comprising:
    a first lens unit of negative optical power;
    a second lens unit of positive optical power, the second lens unit being disposed on the image side of the first lens unit,
    wherein the second lens unit includes a lens element disposed closest to the object side, the lens element including:
    a rim;
    a surface on the object side and having a vertex; and

TABLE 1

| Condition | | Lower Limit | Upper Limit | Numerical Example 1 | Numerical Example 2 | Numerical Example 3 |
|---|---|---|---|---|---|---|
| (1) | D2S | | | 0.500 | 0.450 | 0.450 |
| | D2R | | | 0.947 | 0.976 | 1.010 |
| | D2S/D2R | 0.2 | 0.9 | 0.528 | 0.461 | 0.446 |
| (2) | D2S | | | 0.500 | 0.450 | 0.450 |
| | L1T | | | 0.415 | 0.385 | 0.268 |
| | ft | | | 17.065 | 17.410 | 17.824 |
| | (D2S + L1T)/ft | 0.02 | 0.08 | 0.054 | 0.048 | 0.040 |
| (3) | f1 | | | −13.857 | −12.547 | −11.856 |
| | fw | | | 5.951 | 5.802 | 6.005 |
| | f1/fw | −2.6 | −1.6 | −2.328 | −2.162 | −1.974 |
| (4) | f2 | | | 9.689 | 9.113 | 8.531 |
| | Fw | | | 5.951 | 5.802 | 6.005 |
| | f2/fw | 1.2 | 2.0 | 1.628 | 1.571 | 1.421 |
| (5) | DL1 | | | 4.450 | 4.500 | 4.300 |
| | DL2 | | | 4.229 | 4.237 | 4.197 |
| | DL3 | | | 1.300 | 1.250 | 1.300 |
| | fw | | | 5.951 | 5.802 | 6.005 |
| | (DL1 + DL2 + DL3)/fw | 1.3 | 2.0 | 1.677 | 1.721 | 1.632 |
| (6) | f11 | | | −6.593 | −6.409 | −6.568 |
| | f21 | | | 5.898 | 4.783 | 4.573 |
| | f11/f21 | −1.6 | −0.8 | −1.118 | −1.340 | −1.436 | an intersection point defined by an intersection between the surface and the rim;

a third lens unit of positive optical power, the third lens unit being disposed on the image side of the second lens unit; and an aperture stop determining an effective aperture diameter of the lens system, the position of the aperture stop along the optical axis being between the vertex and the intersection point and being a negative distance with respect to the vertex, indicating that the position of the aperture stop is on the image side of the vertex, wherein the first to third lens units are provided in order from the object side to the image side such that there is no lens unit between the second lens unit and the third lens unit, wherein spaces between the first, second and third lens units vary during zooming, and wherein a distance at a telephoto end between a vertex on the image side of a lens element of the first lens unit that is closest to the image side and the vertex on the object side of the lens element of the second lens unit that is closest to the object side (L1T), a distance along the optical axis between the vertex on the object side of the lens element of the second lens unit and the aperture stop (D2S), and a focal length at the telephoto end of the entire zoom lens system (ft) satisfy the following condition:

$$0.02<(D2S+L1T)/ft<0.08.$$

2. The zoom lens system according to claim 1, wherein the first lens unit consists of, in order from the object side to the image side, a negative meniscus lens with a convex surface on the object side and a positive meniscus lens with a concave surface on the image side.

3. The zoom lens system according to claim 1, wherein the second lens unit includes, in order from the object side to the image side, a cemented lens composed of a positive and a negative lens, and a lens having convex surfaces on the object side and the image side.

4. The zoom lens system according to claim 1, wherein, in zooming from a wide-angle end to a telephoto end, the first lens unit moves in a curve convex towards the image side, the second lens unit moves to the object side, and the third lens unit moves to the image side.

5. The zoom lens system according to claim 1, wherein a distance along the optical axis between the vertex to the object and the aperture stop (D2S), and a distance along the optical axis between the vertex to the object and the intersection point (D2R) satisfy the following condition:

$$0.2<D2S/D2R<0.9.$$

6. The zoom lens system according to claim 1, wherein the third lens unit moves toward the object side to shift focus from an object at infinity to an object nearby.

7. The zoom lens system according to claim 1, wherein a focal length of a lens element of the first lens unit that is closest to the object side (f11), and a focal length of the lens element of the second lens unit that is closest to the object side (f21) satisfy the following condition:

$$-1.6<f11/f21<-0.8.$$

8. The zoom lens system according to claim 1, wherein the zoom lens system forms an image on a solid-state image sensor.

9. An image pickup apparatus comprising:
the zoom lens system according to claim 1; and
a solid-state image sensor receiving light from an image formed by the zoom lens system.

10. A zoom lens system having an optical axis and object and image sides, comprising:
a first lens unit of negative optical power;
a second lens unit of positive optical power, the second lens unit being disposed on the image side of the first lens unit,
wherein the second lens unit includes a lens element disposed closest to the object side, the lens element including:
a rim;
a surface on the object side and having a vertex; and
an intersection point defined by an intersection between the surface and the rim;
a third lens unit of positive optical power, the third lens unit being disposed on the image side of the second lens unit; and
an aperture stop determining an effective aperture diameter of the lens system, the position of the aperture stop along the optical axis being between the vertex and the intersection point and being a negative distance with respect to the vertex, indicating that the position of the aperture stop is on the image side of the vertex,
wherein the first to third lens units are provided in order from the object side to the image side such that there is no lens unit between the second lens unit and the third lens unit,
wherein spaces between the first, second and third lens units vary during zooming, and
wherein a distance between a vertex on the object side of a lens element of the first lens unit that is closest to the object side and the vertex on the image side of the lens element of the first lens unit that is closest to the image side (DL1), a distance between a vertex on the object side of the lens element of the second lens unit that is closest to the object side and a vertex on the image side of the lens element of the second lens unit that is closest to the image side (DL2), a distance between a vertex on the object side of a lens element of the third lens unit that is closest to the object side and a vertex on the image side of the lens element of the third lens unit that is closest to the image side (DL3), and a focal length at the wide-angle end of the entire zoom lens system (fw) satisfy the following condition:

$$1.3<(DL1+DL2+DL3)/fw<2.0.$$

11. The zoom lens system according to claim 10, wherein the first lens unit consists of, in order from the object side to the image side, a negative meniscus lens with a convex surface on the object side and a positive meniscus lens with a concave surface on the image side.

12. The zoom lens system according to claim 10, wherein the second lens unit includes, in order from the object side to the image side, a cemented lens composed of a positive and a negative lens, and a lens having convex surfaces on the object side and the image side.

13. The zoom lens system according to claim 10, wherein, in zooming from a wide-angle end to a telephoto end, the first lens unit moves in a curve convex towards the image side, the second lens unit moves to the object side, and the third lens unit moves to the image side.

14. The zoom lens system according to claim 10, wherein a distance along the optical axis between the vertex to the object and the aperture stop (D2S), and a distance along the optical axis between the vertex to the object and the intersection point (D2R) satisfy the following condition:

$$0.2 < D2S/D2R < 0.9.$$

15. The zoom lens system according to claim 10, wherein the third lens unit moves toward the object side to shift focus from an object at infinity to an object nearby.

16. The zoom lens system according to claim 10, wherein a focal length of a lens element of the first lens unit that is closest to the object side (f11), and a focal length of the lens element of the second lens unit that is closest to the object side (f21) satisfy the following condition:

$$-1.6 < f11/f21 < -0.8.$$

17. The zoom lens system according to claim 10, wherein the zoom lens system forms an image on a solid-state image sensor.

18. An image pickup apparatus comprising:
the zoom lens system according to claim 10; and
a solid-state image sensor receiving light from an image formed by the zoom lens system.

19. A zoom lens system having an optical axis and object and image sides, comprising:
a first lens unit of negative optical power;
a second lens unit of positive optical power, the second lens unit being disposed on the image side of the first lens unit,
wherein the second lens unit includes a lens element disposed closest to the object side, the lens element including:
a rim;
a surface on the object side and having a vertex; and
an intersection point defined by an intersection between the surface and the rim;
a third lens unit of positive optical power, the third lens unit being disposed on the image side of the second lens unit; and
an aperture stop determining an effective aperture diameter of the lens system, the position of the aperture stop along the optical axis being between the vertex and the intersection point and being a negative distance with respect to the vertex, indicating that the position of the aperture stop is on the image side of the vertex,
wherein the first to third lens units are provided in order from the object side to the image side such that there is no lens unit between the second lens unit and the third lens unit,
wherein spaces between the first, second and third lens units vary during zooming, and
wherein a distance along the optical axis between the vertex to the object and the aperture stop (D2S), and a distance along the optical axis between the vertex to the object and the intersection point (D2R) satisfy the following condition:

$$0.2 < D2S/D2R < 0.9.$$

20. An image pickup apparatus comprising:
the zoom lens system according to claim 19; and
a solid-state image sensor receiving light from an image formed by the zoom lens system.

21. A zoom lens system having an optical axis and object and image sides, comprising:
a first lens unit of negative optical power;
a second lens unit of positive optical power, the second lens unit being disposed on the image side of the first lens unit,
wherein the second lens unit includes a lens element disposed closest to the object side, the lens element including:
a rim;
a surface on the object side and having a vertex; and
an intersection point defined by an intersection between the surface and the rim;
a third lens unit of positive optical power, the third lens unit being disposed on the image side of the second lens unit; and
an aperture stop determining an effective aperture diameter of the lens system, the position of the aperture stop along the optical axis being between the vertex and the intersection point and being a negative distance with respect to the vertex, indicating that the position of the aperture stop is on the image side of the vertex,
wherein the first to third lens units are provided in order from the object side to the image side such that there is no lens unit between the second lens unit and the third lens unit,
wherein spaces between the first, second and third lens units vary during zooming, and
wherein a focal length of the second lens unit (f2), and a focal length at the wide-angle end of the entire zoom lens system (fw) satisfy the following condition:

$$1.2 < f2/fw < 2.0.$$

22. An image pickup apparatus comprising:
the zoom lens system according to claim 21; and
a solid-state image sensor receiving light from an image formed by the zoom lens system.

* * * * *